(12) United States Patent
Brief

(10) Patent No.: US 6,678,760 B2
(45) Date of Patent: Jan. 13, 2004

(54) APPARATUS AND METHOD OF TRANSMITTING AND RECEIVING USB ISOCHRONOUS DATA

(75) Inventor: David Brief, Modi'in (IL)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/013,996

(22) Filed: Dec. 11, 2001

(65) Prior Publication Data

US 2002/0065966 A1 May 30, 2002

Related U.S. Application Data

(62) Division of application No. 09/003,897, filed on Jan. 7, 1998, now abandoned.

(51) Int. Cl.[7] .............................................. G06F 13/14
(52) U.S. Cl. ....................... 710/52; 709/245; 370/401; 710/104
(58) Field of Search ................... 710/52, 104; 709/245; 370/401

(56) References Cited

U.S. PATENT DOCUMENTS

| | | | | |
|---|---|---|---|---|
| 4,292,683 A | | 9/1981 | Jueneman ................... 370/104 |
| 4,439,859 A | * | 3/1984 | Donnan ........................ 371/32 |
| 4,524,448 A | | 6/1985 | Hullwegen ................... 375/118 |
| 4,737,957 A | | 4/1988 | Nohmi et al. ................. 371/49 |
| 4,858,112 A | | 8/1989 | Puerzer et al. .............. 364/200 |
| 5,058,110 A | | 10/1991 | Beach et al. ............... 370/85.6 |
| 5,343,480 A | * | 8/1994 | Hasegawa ..................... 371/34 |
| 5,406,322 A | | 4/1995 | Port et al. ..................... 348/15 |
| 5,438,575 A | | 8/1995 | Bertrand ....................... 371/48 |
| 5,548,593 A | * | 8/1996 | Peschi ........................ 370/94.1 |
| 5,745,685 A | * | 4/1998 | Kirchner et al. ........ 395/200.14 |
| 5,754,754 A | * | 5/1998 | Dudley et al. .......... 395/182.16 |
| 6,070,208 A | | 5/2000 | Brief ........................... 710/104 |
| 6,122,676 A | | 9/2000 | Brief et al. ..................... 710/9 |
| 6,157,975 A | | 12/2000 | Brief et al. .................. 710/104 |
| 6,185,641 B1 | | 2/2001 | Dunnihoo ..................... 710/56 |
| 6,205,501 B1 | | 3/2001 | Brief et al. ................... 710/100 |
| 6,229,802 B1 | | 5/2001 | Hippelainen ................ 370/349 |

OTHER PUBLICATIONS

*USB Feature Specification: Shared Endpoints; SystemSoft Corporation, Intel Corporation, pp. i–iii, 1–14; Dec. 4, 1997.
*Universal Serial Bus Common Class Specification; SystemSoft Corporation, Intel Corporation, pp. i–v, 1–14, Dec. 4, 1997.
*Universal Serial Bus Specification; Compaq; Digital Equipment Corporation, IBM PC Company, Intel, Microsoft, NEC, Northern Telecom; pp. 1–268; Jan. 15, 1996.
*8x930 Ax, 8x930Hx Users Manual; Intel; pp. 6.1–10.1 Appendix B–D; 1997.
USB Node Interface Architecture Specification, Revision 0.6—Preliminary; National Semiconductor Corporation; 51 pages; Jan. 4, 1998.

* cited by examiner

Primary Examiner—Abdelmoniem Elamin
(74) Attorney, Agent, or Firm—Girard & Equitz LLP

(57) ABSTRACT

An apparatus for and method of transmitting and synchronizing isochronous data on a USB endpoint pipe are disclosed. Also disclosed are a double buffering capability, a transmission delay capability, a synchronization capability, and a clock adjustment capability.

6 Claims, 3 Drawing Sheets

APPARATUS AND METHOD OF TRANSMITTING AND RECEIVING USB ISOCHRONOUS DATA

Cross-Reference to Related Application

The present application is a division of U.S. patent application Ser. No. 09/003,897, filed on Jan. 7, 1998 (now abandoned).

BACKGROUND OF THE INVENTION

1. Field of the Invention

The present invention relates to the Universal Serial Bus (USB) protocol. In particular, the invention relates to the control of versatile USB endpoints.

2. Description of the Related Art

Universal Serial Bus (USB) is a standard peripheral interface for attaching personal computers to a wide variety of devices: e.g., digital telephone lines, monitors, modems, mice, printers, scanners, game controllers, keyboards, and other peripherals. The USB thus replaces existing interfaces such as the RS-232C serial ports, parallel ports, PS/2 interfaces, and game/MIDI ports.

In accordance with USB, all attached devices connect to a personal computer through a single connector type using a tiered-star topology. A host personal computer includes a single USB controller. The host controller provides the interface between the USB network and the host personal computer. The host controller controls all accesses to USB resources and monitors the bus's topology. A USB hub provides USB attachment points for USB devices.

A USB function is a USB device that is able to transmit and receive information on the bus. A function may have one, or more, configurations, each of which defines the interfaces that make up the device. Each interface, in turn, is made up of one or more endpoints.

An endpoint is the ultimate source, or sink, of data. An endpoint pipe provides for the movement of data between USB and memory, and completes the path between the USB host and the function endpoint.

Each endpoint is an addressable entity on USB and is required to respond to IN and OUT tokens from the USB host (typically a PC). IN tokens indicate that the host has requested to receive information from an endpoint, and OUT tokens indicate that the host is about to send information to an endpoint.

On detection of an IN token addressed to an endpoint, the endpoint is responsible for responding with a data packet. If the endpoint is currently stalled, a STALL handshake packet is sent. If the endpoint is enabled, but no data is present, a negative acknowledgment (NAK) handshake packet is sent.

Similarly, on detection of an OUT token addressed to an endpoint, the endpoint is responsible for receiving a data packet sent by the host and storing it in a buffer. If the endpoint pipe is currently stalled, at the end of the data transmission, a STALL handshake packet is sent. If the endpoint pipe is currently disabled, at the end of the data transmission, no handshake packet is sent. If the endpoint pipe is enabled, but no buffer is present in which to store the data, a NAK handshake packet is sent.

A disabled endpoint, or endpoints not currently mapped to an endpoint pipe do not respond to IN, OUT, or SETUP tokens.

A number of vendors have developed implementations of the USB standard. For example, Intel Corp. has released the 8×931Ax, 8×931Hx, 8×930Ax, and 8×930Hx devices.

However, these devices have a number of problems. They do not process the start-of-frame packets for isochronous data. There is a need for a device to do this so errors can be more easily detected.

They do not provide hardware support for data synchronization. There is a need to do this so that packet transmissions can be synchronized or delayed.

The required buffer size for isochronous data can vary greatly depending on the application. For example, telephony requires 8 bytes and video requires 960 bytes. The Intel devices each have a dedicated buffer for each endpoint. There is a need for a device which allows more flexibility in defining the buffering capabilities of endpoints.

SUMMARY OF THE INVENTION

The present invention addresses these and other problems by allowing synchronization of packets, providing a shared buffer, allowing clock control, and allowing packet transmission to be delayed.

According to one embodiment, an apparatus according to the present invention sends isochronous data from a USB endpoint to a USB host, and includes a buffer memory, a pointer memory, a pointer controller, a counter memory, a data processor, and a controller. The pointer controller stores in the pointer memory an address pointer corresponding to the buffer memory. The counter memory stores a counter value. The data processor generates a data packet in the buffer memory. The controller selectively increments the counter value until it equals the address pointer, then sends the data packet.

According to another embodiment, an apparatus according to the present invention sends isochronous data from a USB endpoint to a USB host, and includes a buffer memory, a data processor, a delay memory, a counter memory, and a controller. The data processor generates a data packet in the buffer memory. The delay memory stores a delay value corresponding to the data packet. The counter memory stores a counter value. The controller selectively increments the counter value until it equals the delay value, then sends the data packet.

According to yet another embodiment, an apparatus according to the present invention adjusts a USB bus clock frequency and includes a reference clock signal generator, a signal processor, and a controller. The reference clock signal generator generates a reference clock signal having a reference clock frequency. The signal processor is configured to receive a USB bus clock signal and detect its frequency. The controller is configured to compare the reference clock frequency and the USB bus clock frequency and to transmit a control signal to a USB host. The controller transmits a clock increase signal when the reference clock frequency is greater than the USB bus clock frequency, and a clock decrease signal when the reference clock frequency is less than the USB bus clock frequency.

According to another embodiment, an apparatus according to the present invention receives isochronous data at a USB endpoint from a USB host and includes a first memory, a second memory, a receiver, and a controller. The receiver sequentially receives a first data packets having a first sequence number and a second data packet having a second sequence number. The first memory stores the first data packet and the second memory stores the second data packet. The controller generates an interrupt if a difference between the first sequence number and the second sequence number is greater than three.

According to still another embodiment, an apparatus according to the present invention receives isochronous data at a USB endpoint from a USB host, and includes a buffer memory, a delay memory, a counter memory, a receiver, and a controller. The receiver receives a plurality of data packets and delay information corresponding to a specific data packet of the plurality. The delay memory stores the delay information. The counter memory stores a counter value. The controller selectively increments the counter value until it equals the delay value, then writes the data packet to the buffer memory.

According to yet another embodiment, an apparatus according to the present invention transmits isochronous data between a USB endpoint and a USB host, and includes a plurality of USB endpoints, a buffer memory, a plurality of control memories, and a controller. The plurality of endpoints are configured to communicate data with a USB host on a plurality of USB endpoint pipes. The buffer memory is shared among the endpoints and can store an isochronous data packet. Each control memory corresponds to one of the endpoints. The controller selects one of the endpoints, reads the associated control word, and communicates the data packet on an endpoint pipe corresponding to that endpoint.

According to another embodiment, a method according to the present invention sends isochronous data from a USB endpoint to a USB host, and includes the steps of generating a data packet, generating an address pointer, and incrementing a counter value until it equals the address pointer, then sending the data packet.

According to yet another embodiment, a method according to the present invention sends isochronous data from a USB endpoint to a USB host, and includes the steps of generating a data packet, generating a delay value, and incrementing a counter value until it equals the delay value, then sending the data packet.

According to still another embodiment, a method according to the present invention signals a USB bus clock frequency adjustment and includes the steps of generating a reference clock frequency, receiving a USB bus clock signal and detecting a USB bus clock frequency thereof, comparing the reference clock frequency and the USB bus clock frequency, transmitting a clock increase signal to a USB host if the reference clock frequency is greater than the USB bus clock frequency, and transmitting a clock decrease signal to said USB host if the reference clock frequency is less than the USB bus clock frequency.

According to another embodiment, a method according to the present invention receives isochronous data at a USB endpoint from a USB host, and includes the steps of receiving a first data packet having a first sequence number, sequentially receiving a second data packet having a second sequence number, and generating an interrupt if a difference between the first sequence number and the second sequence number is greater than three.

According to yet another embodiment, a method according to the present invention receives isochronous data at a USB endpoint from a USB host, and includes the steps of receiving a data packet, generating a delay value, and incrementing a counter value until the counter value is equal to the delay value, then writing the data packet to a buffer memory.

A better understanding of the features and advantages of the present invention will be obtained by reference to the following detailed description and accompanying drawings which set forth illustrative embodiments in which the principles of the invention are utilized.

DETAILED DESCRIPTION OF THE PREFERRED EMBODIMENTS

The invention described in this application is an aspect of a larger set of inventions described in the following applications which are commonly owned by the assignee of the present application:

U.S. patent application Ser. No. 09/003,963 (issued as U.S. Pat. No. 6,070,208); U.S. patent application Ser. No. 09/004,003; U.S. patent application Ser. No. 09/004,004 (issued as U.S. Pat. No. 6,122,676); U.S. patent application Ser. No. 09/004,002 (issued as U.S. Pat. No. 6,205,501); U.S. patent application Ser. No. 09/004,005 (issued as U.S. Pat. No. 6,157,975); and U.S. patent application Ser. No. 09/003,925, each filed on Jan. 7, 1998.

In addition, the National Semiconductor document filed herewith entitled USB Node Interface Architecture Specification, Revision 0.6, describes related technology.

GENERAL DESCRIPTION OF THE INVENTION

Figure 1:
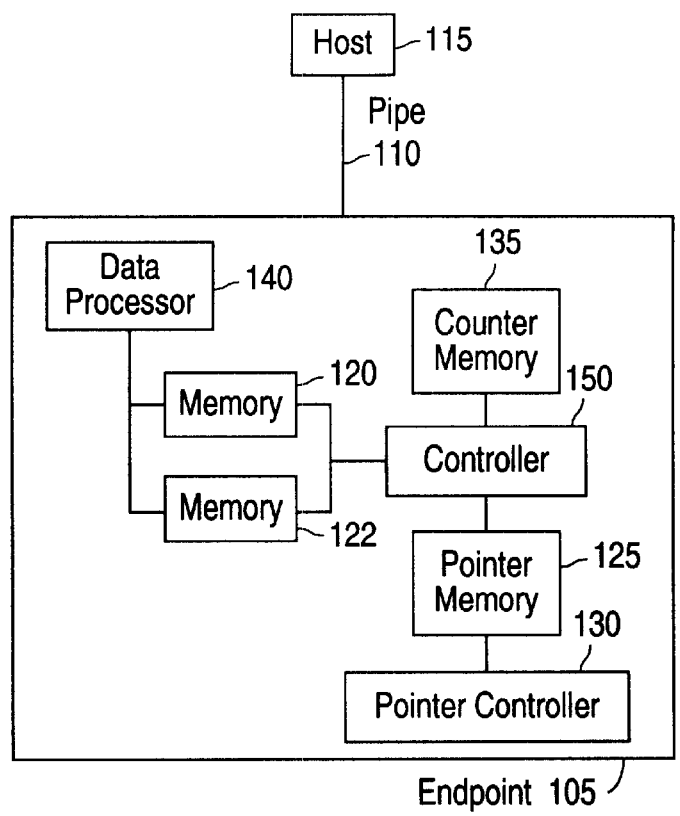
FIG. 1 is a block diagram of a data transmission embodiment of the present invention.

FIG. 1 illustrates a general embodiment of one aspect of the present invention. FIG. 1 shows an endpoint 105, an endpoint pipe 110, a host 115, a first memory 120, a second memory 122, a pointer memory 125, a pointer controller 130, a counter memory 135, a data processor 140, and a controller 150. Pointer controller 130 stores in pointer memory 125 an address pointer corresponding to first memory 120. Counter memory 135 stores a counter value. Data processor 140 generates a first data packet in first memory 120. Controller 150 selectively increments the counter value until it equals the address pointer and then sends the first data packet. Alternatively, endpoint 105 is one of a number of endpoints at the end of endpoint pipe 110 which share the memories, the controllers, and the data processor.

The embodiment shown in FIG. 1 operates as follows. The counter value begins at zero. If the address pointer is also zero, then controller 150 sends the first data packet. Otherwise, controller 150 selectively increments the counter value until it equals the address pointer, then it sends the first data packet. In a preferred embodiment, the address pointer alternates between first memory 120 and second memory 122. Thus there is at most one increment before the send.

If there is more data to send, data processor 140 generates a second data packet in second memory 122. After controller 150 sends the first data packet, pointer controller 130 stores in pointer memory 125 a second address pointer corresponding to second memory 122, and controller 150 selectively increments the counter value until it equals the second address pointer, and then sends the second data packet. In a preferred embodiment, the address pointer alternates between first memory 120 and second memory 122. Thus the sending of two packets can be synchronized.

If there is still more data to send, after controller 150 sends the first data packet, data processor 140 generates a third data packet in first memory 120. After controller 150 sends the second data packet, pointer controller 130 stores in pointer memory 125 a third address pointer corresponding to first memory 120, and controller 150 selectively increments the counter value until it equals the third address pointer, and then sends the third data packet. This shows how in a preferred embodiment a sequence of packets can be synchronized in two buffers.

Although this specification uses the term "data packet", the invention is also intended to apply to a plurality of data even if the data is not contained in a discrete packet.

Figure 2:
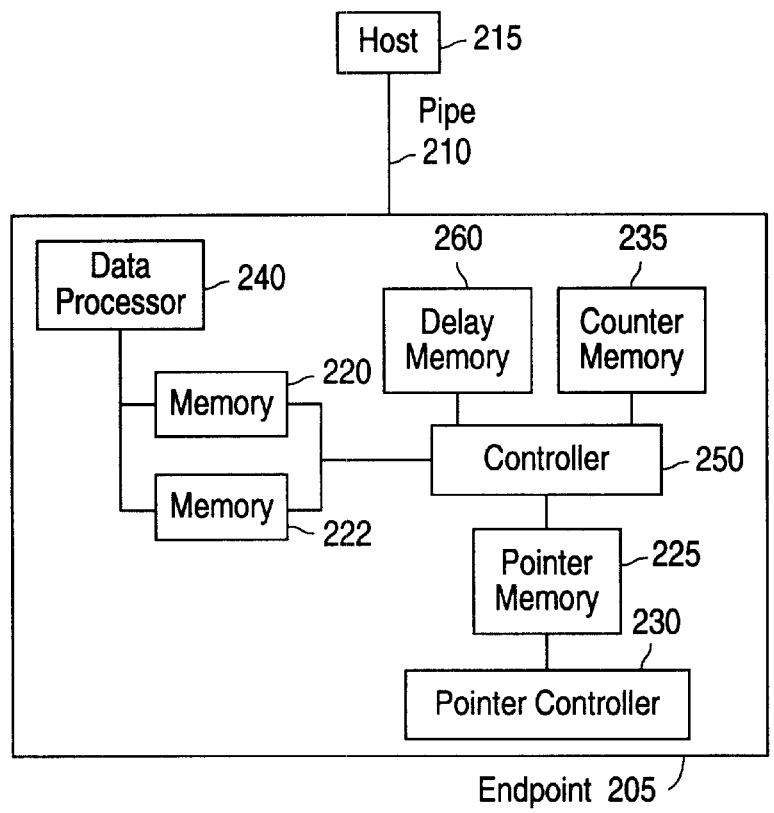
FIG. 2 is a block diagram of another data transmission embodiment of the present invention.

FIG. 2 illustrates a general embodiment of another aspect of the present invention. FIG. 2 shows an endpoint 205, an endpoint pipe 210, a host 215, a first memory 220, a second memory 222, a pointer memory 225, a pointer controller 230, a counter memory 235, a data processor 240, a controller 250, and a delay memory 260. Data processor 240 generates a first data packet in first memory 220. Delay memory 260 stores a delay value corresponding to the first data packet. Counter memory 235 stores a counter value. Controller 250 selectively increments the counter value until it equals the delay value and then sends the first data packet. Alternatively, endpoint 205 is one of a number of endpoints at the end of endpoint pipe 210 which share the memories, the controllers, and the data processor.

The embodiment shown in FIG. 2 operates as follows. The counter value begins at zero. If the delay value is also zero, then controller 250 sends the first data packet. Otherwise, controller 250 selectively increments the counter value until it equals the address pointer, then it sends the first data packet. This allows the first packet to be delayed for a period of time.

If there is more data to send, pointer controller 230 stores in pointer memory 225 an address pointer corresponding to second memory 222. Data processor 240 generates a second data packet in second memory 222. After controller 250 sends the first data packet, it selectively increments the counter value until the counter value equals the address pointer and then sends the second data packet. This shows how the second data packet can be synchronized to follow the first data packet.

If there is still more data to send, after controller 250 sends the first data packet, data processor 240 generates a third data packet in first memory 220. After controller 250 sends the second data packet, pointer controller 230 stores in pointer memory 225 a second address pointer corresponding to first memory 220, and controller 250 selectively increments the counter value until it equals the second address pointer and then sends the third data packet. This shows how, in a preferred embodiment with two buffers, multiple data packets can be synchronized.

Figure 3:
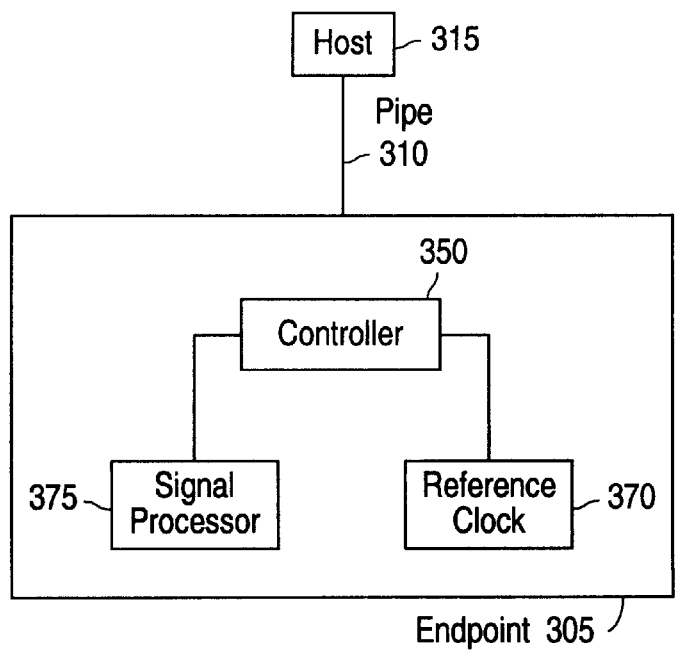
FIG. 3 is a block diagram of a clock adjustment embodiment of the present invention.

FIG. 3 illustrates a general embodiment of another aspect of the present invention. FIG. 3 shows an endpoint 305, an endpoint pipe 310, a host 315, a controller 350, a reference clock signal generator 370, and a signal processor 375. Reference clock 370 generates a reference clock signal having a reference clock frequency. Signal processor 375 receives a USB bus clock signal and detects its frequency. Controller 350 transmits a clock increase signal if the reference clock frequency is greater than the USB bus clock frequency, and a clock decrease signal if the reference clock frequency is less than the USB bus clock frequency.

The embodiment shown in FIG. 3 operates as follows. Host 315 sends and receives data packets on pipe 310 at the USB bus clock frequency. Signal processor 375 detects the USB bus clock frequency. Controller 350 compares the USB bus clock frequency and the reference clock frequency and generates the clock control signal. Host 315 receives the clock control signal and can adjust the USB bus clock frequency accordingly.

In a preferred embodiment, the signals are indicated by the transmission of packets between endpoint 305 and host 315.

Figure 4:
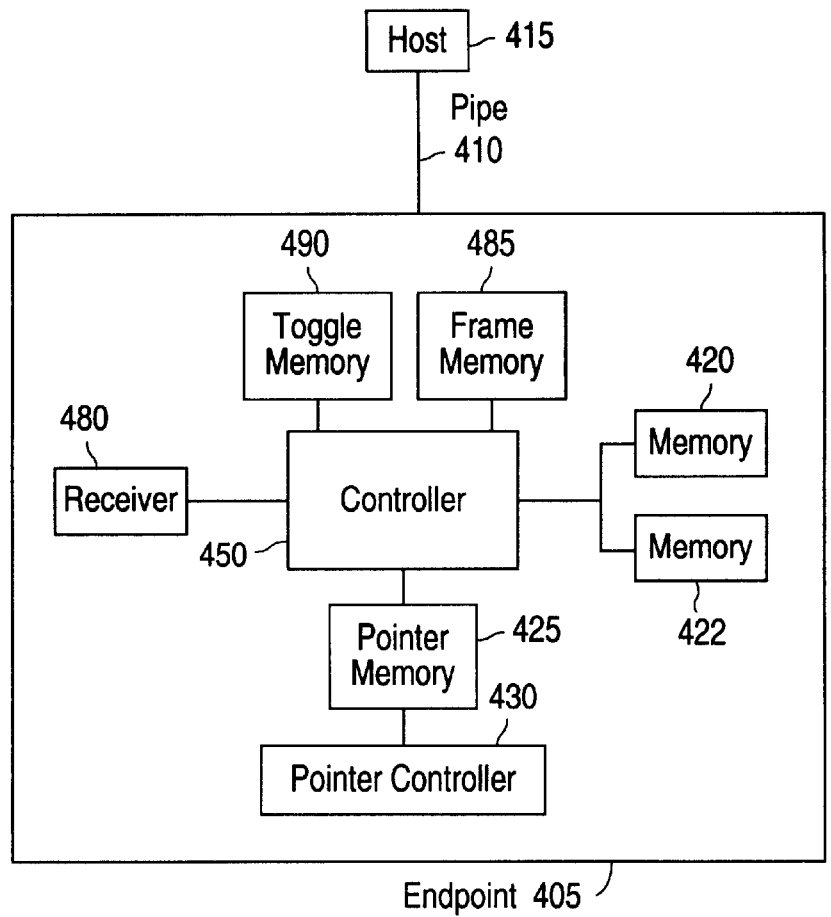
FIG. 4 is a block diagram of a data reception embodiment of the present invention.

FIG. 4 illustrates a general embodiment of another aspect of the present invention. FIG. 4 shows an endpoint 405, an endpoint pipe 410, a host 415, a first memory 420, a second memory 422, a pointer memory 425, a pointer controller 430, a controller 450, a receiver 480, a frame number memory 485, and a toggle memory 490. Receiver 480 sequentially receives a first data packet having a first sequence number and a second data packet having a second sequence number. Controller 450 generates an interrupt if a difference between the first sequence number and the second sequence number is greater than three. First memory 420 can store the first data packet. Second memory 422 can store the second data packet. Alternatively, endpoint 405 is one of a number of endpoints at the end of endpoint pipe 410 which share the memories, the controllers, and the receiver.

In a preferred embodiment, host 415 sends framing packets which contain a frame number. Controller 450 can determine if data packets are missing by comparing the received frame number with the expected frame number based on previous frame numbers it has received.

Besides detecting missing data packets, the embodiment shown in FIG. 4 can write received data packets to memory. Pointer controller 430 stores in pointer memory 425 an address pointer corresponding to first memory 420. Toggle memory 490 stores a toggle value.

The embodiment shown in FIG. 4 operates as follows. Receiver 480 receives a framing packet having a frame number. Controller 450 stores the frame number in frame number memory 485. If the toggle value is set and if at least a portion of the frame number corresponds to at least a portion of the address pointer, controller 450 writes the first data packet to first memory 420. If the toggle value is not set, controller 450 writes the first data packet to first memory 420, and if at least a portion of the frame number fails to correspond to at least a portion of the address pointer, the controller generates an error flag. This allows easy detection of synchronization errors.

In a preferred embodiment, the address pointer is a 1-bit control word pointer and the portion of the frame number compared is the least significant bit.

Figure 5:
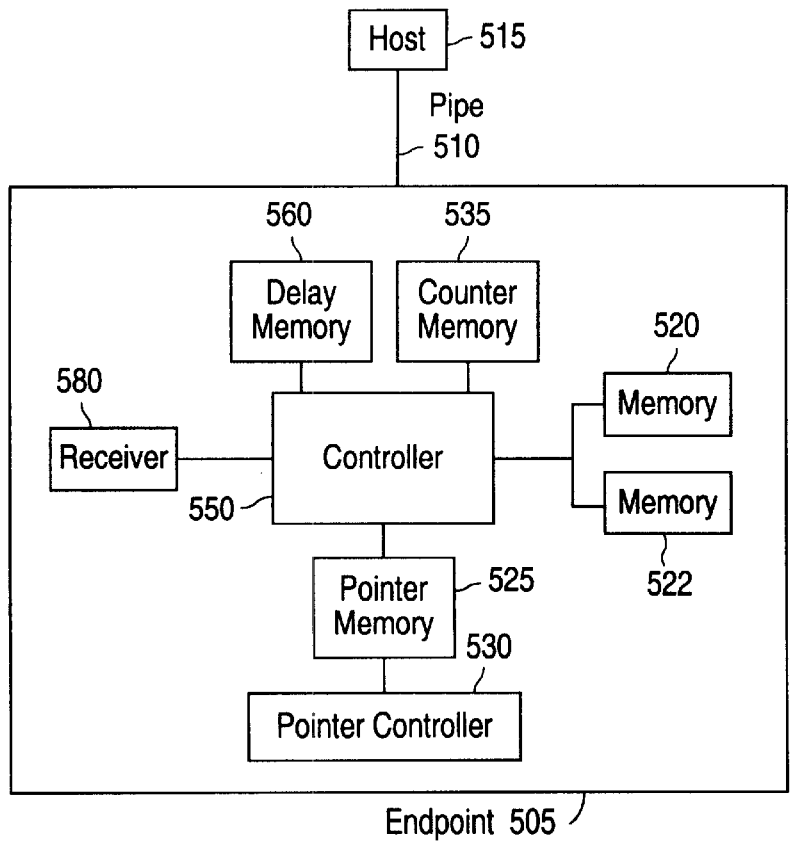
FIG. 5 is a block diagram of another data reception embodiment of the present invention.

FIG. 5 illustrates a general embodiment of another aspect of the present invention. FIG. 5 shows an endpoint 505, an endpoint pipe 510, a host 515, a first memory 520, a second memory 522, a pointer memory 525, a pointer controller 530, a counter memory 535, a controller 550, a delay memory 560, and a receiver 580. Receiver 580 receives a plurality of data packets and delay information corresponding to a specific data packet of the plurality. Delay memory 560 stores the delay information. Counter memory 535 stores a counter value. Controller 550 selectively increments the counter value until the counter value equals the delay value and then writes the specific data packet to first memory 520. Alternatively, endpoint 505 is one of a number of endpoints at the end of endpoint pipe 510 which share the memories, the controllers, and the receiver.

The embodiment shown in FIG. 5 operates as follows. The counter value begins at zero. If the delay value is also zero, then controller 550 writes the first data packet to first memory 520. Otherwise, controller 550 selectively increments the counter value until it equals the delay value, then it writes the first data packet to first memory 520. This allows the first packet to be delayed for a period of time.

If there is more data to write, second memory 522 is configured to store a second data packet. Pointer controller 530 stores in pointer memory 525 an address pointer corresponding to second memory 522. Receiver 580 receives a second data packet. After controller 550 writes the first data packet, it selectively increments the counter value until the counter value equals the address pointer and then writes the second data packet to second memory 522. This shows how the second data packet can be synchronized to follow the first data packet.

If there is still more data to send, receiver 580 receives a second data packet. After controller 550 writes the first data packet, pointer controller 530 stores in pointer memory 525 a second address pointer corresponding to first memory 520. After controller 550 writes the second data packet, it selectively increments the counter value until the counter value equals the second address pointer and then writes the third data packet to first memory 520. This shows how, in a preferred embodiment with two buffers, multiple data packets can be synchronized.

Figure 6:
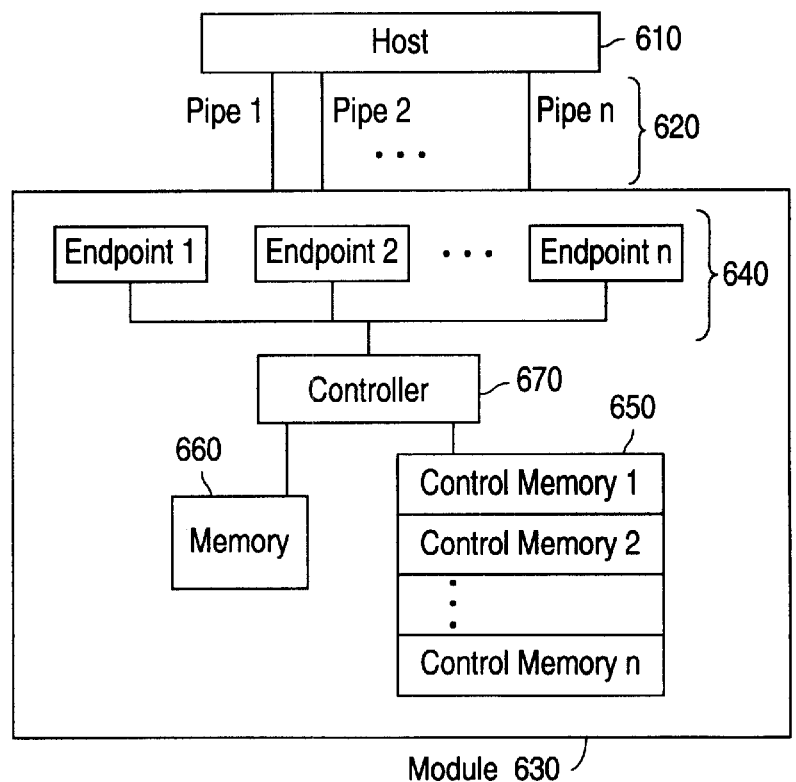
FIG. 6 is a block diagram of a shared buffer memory embodiment of the present invention.

FIG. 6 illustrates a general embodiment of another aspect of the present invention. FIG. 6 shows a host 610, a module 630, a plurality of endpoint pipes 620, a plurality of endpoints 640, a corresponding plurality of control memories 650, a buffer memory 660, and a controller 670. Buffer memory 660 is configured to store an isochronous data packet. Buffer memory 660 is shared among endpoints 640.

In a preferred embodiment, buffer memory 660 contains a double buffer configured to store two isochronous data packets.

The embodiment shown in FIG. 6 operates as follows. Host 610 sends a token on one of the endpoint pipes 620. Controller 670 examines the control memory for the corresponding endpoint. If the endpoint is to receive data, controller 670 transfers a data packet from the endpoint pipe to buffer memory 660. If the endpoint is to send data, controller 670 transfers a data packet from buffer memory 660 to the endpoint pipe.

Although this specification uses the term "memory", the invention is also intended to apply to other types of data storage elements.

This general description is further detailed in the following section, which illustrates preferred embodiments of the aspects of the present invention.

PREFERRED EMBODIMENTS OF THE INVENTION

In a preferred embodiment, the invention described above is implemented as parts of a USB node interface module (UNIM). Parts of the UNIM relevant to the invention of the present application include an endpoint controller, synchronization support, a control word, various registers, and isochronous endpoint operation. These portions are taken from the USB Node Interface Architecture Specification, Revision 0.6, attached as Appendix A.

Endpoint Controller

In a preferred embodiment, the endpoint controller handles the endpoint related operations including endpoint pipe state, buffering and transfers. In a preferred embodiment, up to 16 endpoint pipes (and their corresponding endpoints) can be supported at any given time. Each endpoint pipe can be allocated up to two buffers, in the core bus address space, that are used for receive and transmit operations. If no buffers are allocated to an endpoint pipe, the controller is responsible for providing appropriate handshakes for input tokens and output tokens.

The endpoint controller includes several functional blocks. The endpoint state machine provides the centralized control for the utility blocks of the data alignment multiplexer (DALM), the address generator (ADGen), and the partial endpoint pipe (PEP) storage. Device functions such as address checking and generation are accomplished in the device function block. In a preferred embodiment, all the state machines run on a 12 MHz USB clock. All data transfers work on a core bus clock. Parts of the ADGen block, and all the DALM block, operate using the core bus clock. All other blocks of the endpoint controller use the local 12 MHz clock exclusively. Data bytes between the domains are synchronized at the MAC user interface with an asynchronous handshake for each transferred byte.

In a preferred embodiment, the endpoint controller minimizes the number of memory accesses required. Only on reception of a token is a memory access required to the endpoint array. A single double-word access, together with the resident endpoint state, is sufficient to allow the endpoint pipe to process the host request. This access reads the location and size information for the data transfer. The data transfer occurs in successive double-word read or write operations. The module has the highest priority on the core bus for transfers, and the transfer rate is considerably higher than that of USB. Thus, there is a minimal requirement for data buffering within the endpoint controller, aside from an extra word to overlap subsequent accesses with the current one.

A byte counter keeps track of the number of bytes that are transferred. The last access of a transfer may require a partial read or write of memory. The partial write of the last access is determined by the final byte count.

At the end of a transfer, the current control word is written with status for the transfer, and the other control word for this endpoint is read to check to see if another buffer was prepared. After the control word operations, the endpoint pipe state is updated.

Synchronization Support

Through a combination of hardware and software, the UNIM supports all three USB defined synchronization classes, Asynchronous, Synchronous and Adaptive. As described previously, the endpoint controller provides hardware assistance for monitoring the USB 1 KHz bus clock relative to an external reference such as an 8 KHz reference, and for monitoring the quality and consistency of the USB 1 KHz bus clock. Rising edges of an external reference clock are counted in the reference count register. This can be used to compare to the USB frame number. The difference in frequency between the reference clock and the USB clock can be signaled in packets to the host, such that the host can adjust the USB bus clock frequency; thus the USB reference can be locked to the reference clock.

The endpoint controller also maintains status to indicate when it is locked to the USB 1 KHz bus clock, and when a discontinuity occurs in the USB bus clock due to a missing or incorrect Start_Of_Frame packet. This is used by the software to adjust the queuing of isochronous packets. The current frame number is used by the endpoint controller to determine which isochronous buffer to transmit next.

Control Word

In a preferred embodiment, the endpoint pipe array contains 32 control words, two for each endpoint pipe. The endpoint pipe array is located in memory in an address pointed by an endpoint array base address register EABAR.

This address must be 128-byte aligned (i.e., the 7 LSBs of the address are 0). The endpoint pipe array is indexed by the 4-bit endpoint pipe number EPN, and the control word accessed is determined by the 1-bit endpoint pipe control word pointer CWP. Together the 25-bit EABAR, 4-bit EPN, and one bit CW generate a 32-bit address aligned to a double-word (32-bit) boundary, and are used to access the 32-bit control word.

The 32-bit control word contains all the information required to operate this endpoint pipe, when active. There are two such entries for each endpoint pipe. The control word to be accessed next is determined by the endpoint pipe control word pointer CWP value. Immediately after a IN, OUT or SETUP token is received to an endpoint pipe currently in a ready state, the control word of the selected endpoint pipe at the current control word pointer is read to determine how to respond to the token. At the end of a transfer, when completion status is written, the control word is updated with the current status, the CWP is incremented, and the other control word is read. When intermediate status is written, only the most significant byte of the control word is updated. The control word format is shown below:

| Bits | Function Label |
| --- | --- |
| 31–28 | Buffer State BS |
| 27 | (Reserved) |
| 26–16 | Buffer Address BA |
| 15 | Buffer Page BP |
| 14 | Buffer Rounding BR |
| 13 | Toggle Enable TE |
| 12 | Type Isochronous TI |
| 11 | Interrupt on Packet Complete IC |
| 10 | Interrupt on Packet Error IE |
| 9–0 | Byte Count BC |

The 4-bit buffer state BS is one portion of the control word relevant to the invention of the present application. The buffer state is updated by software and the endpoint pipe controller (EPC) to synchronize the control of this buffer between them. EPC writes status indicating the use of the buffer. This field is set by node firmware to Output Ready, Input Ready, Setup Ready, Skip, Stall and Disable. All other values are set by the EPC. The EPC can also write the Stall and disable values in error conditions. The buffer can be reclaimed by node firmware when the buffer state is any of the Complete values; this includes the Input/Output Complete Status and the Error codes.

The buffer state BS can take the following values:

0: Skip. This value is used together with the Output Ready Command. Skip causes the next data packet received to be ignored and the control word pointer to be incremented. For control endpoints, this also causes the endpoint pipe state to switch from the input/ready state to the output/input Idle state. The setting of TE and TI determines which handshake is returned, and the next state of the endpoint pipe. A NAK is returned if neither TE or TI is set. If TI is set, and not TE, no handshake is returned. If TE is set, an ACK is returned and complete status is written when a packet with the proper PID is received.

1: Input Ready IRDY. This value indicates that the buffer has been written with data to transmit in response to an IN token.

2: Output Ready ORDY. This value indicates that the buffer has been allocated for writing.

3: Setup Ready SRDY. This value indicates that the buffer has been allocated for writing. This is used only on a Control Endpoint during the first transfer of control read and control write operations. Write only in control word 0.

4: Output Wait OWT. This value indicates that an error occurred while receiving OUT data from the host. This includes detection of a bit stuff error. A retry is expected as this is considered intermediate status, except in the case of an isochronous OUT endpoint where it is treated as completion status.

5: CRC Error CRCE. This value indicates that a bad CRC was detected at the end of an OUT transaction. A retry is expected as this is considered intermediate status, except in the case of an isochronous OUT endpoint where it is treated as completion status.

6: Buffer Error BUFE. This value indicates that during an OUT, data was received faster from USB than it could be written to memory. During an IN, data was not read from memory fast enough to keep up with the USB data rate. A retry is expected on this endpoint.

7: Input Wait IWT. This value indicates that the buffer is being held by the endpoint controller and is waiting to try, or retry, to transmit this buffer at the next opportunity. This occurs in the case of a missed acknowledge.

8: Input Complete ICMP. This value indicates successful completion of this input operation. The buffer may be released.

9: Output Complete OCMP. This value indicates that the buffer is full of data and no error was detected.

10: Token Error TKNE. This value indicates that a token of the wrong type for the current context of this control endpoint pipe was received. If this was an output buffer, then the endpoint is halted. If this was an input buffer, a NAK is sent and the state of the other control word is examined. This is considered a completion status.

11: Isochronous Synchronization Error SYNE. This value indicates that data was received into a buffer with TE=1 and TI=1 but CWP was not equal to the LSB of the FNR. This is considered a completion status.

12: Data Error DATE. For OUT data, when CW.BR is not set and the amount of data received from the host was less than expected, or the allocated buffer was not big enough to store the OUT data. For IN data, this is set if a buffering error occurred and CW.TE was not set or CW.TI was set. This is considered a completion status.

13: (Reserved).

14: Halt. Causes the current endpoint pipe to enter its HALT state, or indicates that the endpoint has entered the HALT state.

15: Disable. Causes the current endpoint pipe to enter its DISABLE state or indicates that the endpoint has entered the DISABLE state.

The Type Isochronous bit TI is used to identify isochronous data transmission. A value of 1 indicates isochronous data, and 0 indicates non-isochronous data.

The Toggle Enable bit TE is used to compare and generate the data packet identifier (PID) value (DATA0/DATA1) with the Control Word Pointer, and can take the following values:

0: The data toggle PID is not checked on OUT transactions and is generated based on the current value of CWP in response to IN tokens. The CWP is incremented (inverted) after each transaction, even if an ACK was not received. For Isochronous endpoints, OUT data is not written to memory until CWP is equal to the least significant bit of the frame number, FNR.FN(0). This has no affect in data sent in response to IN tokens. Data toggle should not be enabled for buffers allocated to receive data sent with the SETUP token.

1: The data toggle PID is checked on OUT transactions and is generated based on the current value of the CWP in response to IN tokens. For OUT transactions, this causes an ACK to be sent in response to out packets whose PID value (DATA0/DATA1) does not match CWP. For IN transactions, CWP is incremented (inverted) after each transaction, only if an ACK handshake is returned in the response timeout period. For isochronous endpoints, OUT data is always written to memory but if FNR.FN(0) is not equal to CWP the isochronous synchronization error SYNE buffer state is written back.

For IN transactions, TE allows the transmitted data PID value to be changed even if a valid ACK is not received in the timeout period. This can be important for certain applications of an interrupt IN endpoint.

For OUT transactions, TE can be used to determine whether or not to check the DATA0 or DATA1 PID in deciding to accept the packet. This can be important for an interrupt OUT endpoint where the most recent data should be received.

The buffer rounding bit BR indicates, for output transactions, if it is permissible to have data buffers of different size than the received data packet, and can have the following values:

0: The data packet should exactly fill the defined data buffer. The buffer overrun or underrun status is given if the packet does not exactly fit the buffer.

1: The data packet may be smaller than the defined buffer without causing an error condition on the endpoint.

When read together with an output complete OCMP or data error DATE buffer status, this field indicates the value of the received PID: 0 for DATA0, and 1 for DATA1.

The Interrupt on Packet Complete bit IC causes an event on this endpoint to be set (EER.EPn) whenever the buffer status is written to input or output complete, on a packet error or when the endpoint pipe is stalled.

The Interrupt of Packet Error bit IE causes an event on the endpoint to be set (EER.EPn) whenever the buffer state is written to one of the buffer error codes, or when the endpoint is stalled. When both IC and IE are set, CRC and bit stuff errors also cause an event to be generated and do not cause these buffers to be reused, as in normal operation. This is intended primarily for diagnostic purposes.

The buffer page bit BP can take the following values:

0: Use buffer page A as the upper address of the input/output buffer.

1: Use buffer page B as the upper address of the input/output buffer.

The buffer address bits BA hold the lower 11 bits of the buffer address. Buffers must start on an aligned double-word boundary and can end on any byte boundary. At the end of all complete transfers, the residual value of the buffer address is written. At the end of incomplete transfers such as when the status is written to input or output wait, this field is not over-written.

For OUT buffers, the first byte stored is the byte following the PID. Similarly for IN buffers, the address points to the first byte of data to be transmitted, i.e., the byte immediately following the PID in the packet. The CRC is automatically calculated and appended to the packet, except when the IN token is received from the IS_RDY state and the control word did not have the IS field set to 1.

The byte count bits BC hold the size of the data buffer to be used. Buffers start on an even double-word boundary, and can end on any byte boundary. For IN transactions, this indicates the size of the data to be transmitted. For OUT transactions, this indicates the size of the buffer in which data can be received. Zero is a legitimate value for the byte count. At the end of all complete transfers, the residual value of the byte counter is written. At the end of incomplete transfers, such as when the status is written to input or output wait, this field is not overwritten.

Registers

In a preferred embodiment, four registers relevant to the invention of the present application are the frame number register, the reference count register, the timer interval register, and the interrupt status register.

In a preferred embodiment, the frame number register (FNR) is word-wide, read only register. FNR provides the current frame number as received in the SOF packet. Upon USB_Reset this register is set to C000h. The FNR register format is shown below:

| Bits | Function Label |
|---|---|
| 15 | Missed Flag MF |
| 14 | Unlocked Flag UL |
| 13–11 | (Reserved) |
| 10–0 | Frame Number FN |

The 1-bit missed flag MF is set indicating a discontinuity in the frame number. This flag is set when the frame number in a valid received SOF does not match the expected next value. The flag is also set when an SOF is not received within 12060 bit times (FLMAX with tolerance) of the previous change of FNR.FN. On reset this flag is set to 1.

The 1-bit unlocked flag UL is set indicating that at least two frames were received without an expected frame number, and that the frame number from the next SOF packet will be loaded in FN. On reset this flag is set to 1.

The 11-bit frame number FN holds the current frame number, as received in the last SOF packet. The value is incremented when an SOF is missed. If two successive frames are missed, or are incorrect, the frame number is loaded with the next frame number from a valid SOF packet. The least significant bit of the frame number is used to determine which isochronous buffer should be used next.

The following program code illustrates the operation of the frame number:

On Receipt of a Valid SOF Packet

```
if ((rcvdSOF.frame_number == FNR+1) or (FNR.UL is 1))
      { FNR.FN <- rcvdSOF.frame_number,
        FNR.MF <- 0, FNR.UL <- 0 }
else  {
      FNR.FN <- FNR.FN + 1;
      if (FNR.MF is 1 and FNR.UL is 0) {
          FNR.UL <- 1;
          ISR.ULD <-1 }
      FNR.MF <- 1; }
      On non-receipt of a valid SOF within 12060 bit
times (or 796 when the short frame bit DCR.SFM is
set) from the previous load of FNR.FN,
FNR.FN <- FNR.FN + 1;
if ((FNR.MF is 1 and FNR.UL is 0) {
      FNR.UL <- 1;
      ISR.ULD <-1 }
FNR.MF <- 1;
```

The reference count register (RCR) is word-wide, read only register. It is used to monitor an external reference clock. Upon reset this register is cleared. The RCR register format is shown below:

| Bits | Function Label |
| --- | --- |
| 15–0 | Reference Count RC |

The 16-bit reference count RC is a count of the number of rising edges detected on the UNIM's clock reference input signal. When read together with the frame number, this can give an accurate reading of the relative frequency of the external reference versus the USB clock. The difference can be signaled to the USB Host, via feedback packets, to delay or advance the SOF packet, to cause the USB clock to effectively lock to the external reference. To maintain a common reference point for software, the reference count is sampled into this register when FNR.FN is loaded with a new value or incremented.

The timer interval register (TIR) is a word-wide, read/write register. It contains a request for an interrupt the next time the frame counter FC reaches the programmed offset. Upon reset this register is cleared. The TIR register format is shown below:

| Bits | Function Label |
| --- | --- |
| 15–8 | (Reserved) |
| 7–0 | Timer Interrupt Interval TI |

The timer interrupt interval TI causes ISR.FCI to be set the next time the frame counter FNR.FN reaches this value.

The interrupt status register ISR is a word-wide, read/write register. It notifies software of events that have occurred that caused an interrupt and required additional processing. Bits are cleared by writing 1 to the bits to be cleared. Upon reset this register is cleared. The ISR register format is shown below:

| Bits | Function Label |
| --- | --- |
| 15–11 | (Reserved) |
| 10 | Holding Setup Token HST |
| 9 | Unlocked Locked Detected ULD |
| 8 | Frame Counter Interrupt FCI |
| 7 | Start of Frame Detected SOFD |
| 6 | End of Packet Detected EOPD |
| 5 | Resume Detected RSMD |
| 4 | Suspend Detected 5 SD5 |
| 3 | Suspend Detected SD |
| 2 | Reset Detected RSTD |
| 1 | Synchronized Endpoint Controller Interrupt SECI |
| 0 | Endpoint Controller Interrupt ECI |

The portion relevant to the present invention is the unlocked locked detected ULD. This indicated that the frame timer has entered the unlocked state from a locked condition as determined by the current value of FNR.UL, the unlocked status bit. Note that since FNR.FN(0) is used to select the next isochronous transmission, adjustment of the isochronous queue on isochronous endpoints may be necessary.

Isochronous Endpoint Operation

Isochronous endpoints follow the same outline as bulk endpoints, however they do not follow a toggle protocol. Instead they are synchronized to the least significant bit of the frame number register.

For input isochronous Endpoints, data is queued using the same IRDY buffers. When an IN token is received on an isochronous endpoint, if the least significant bit of the frame number register matches the control word pointer CWP, the data packet is sent. Otherwise, no data is sent. This allows the data transmissions to be synchronized to a particular frame number. To initiate transmission on a particular frame number, the frame number register can be read. An interrupt can be requested (ISR.FCI) by setting TIR to the requested value of FNR that needs to be matched. A match is done only on the lower eight bits, which allows queuing of this event up to 256 msec before required. When this interrupt is processed, the appropriate buffer can be queued on the endpoint pipe.

For output isochronous endpoints, the toggle enable bit determines how the LSB of the frame number register is used. If TE is not set, all data is written to memory, but if FNR.LSB is not equal to CWP, and synchronization error status (SYNE) is written as the buffer state. If TE is set, data is only stored when FNR.LSB is equal to CWP. When synchronizing an output isochronous stream with the frame number, the first buffer can be set with TE so that writing only starts when there is a frame number match. Then all subsequent frames can detect if there is a synchronization error.

Note that the frame number register continues to count for up to two frames, even if the SOF is temporarily lost. Should the SOF become lost for more than two frames, the unlocked event is signaled (ISR.UL) and at this time all subsequent isochronous transmissions should be treated with caution, or terminated, until the frame number counter becomes locked again.

It should be understood that various alternatives to the embodiments of the invention described herein may be employed in practicing the invention. It is intended that the following claims define the scope of the invention and that structures within the scope of these claims and their equivalents are covered thereby.

What is claimed is:

1. An apparatus for receiving data on at least one isochronous USB endpoint pipe from a USB host, said apparatus comprising:
   a first USB endpoint including a receiver which sequentially receives from the USB host a first plurality of data having a first sequence number and a second plurality of data having a second sequence number;
   a controller coupled to the receiver and configured to generate an interrupt if a difference between said first sequence number and said second sequence number is greater than three;
   a first data storage element configured to store said first plurality of data; and
   a second data storage element configured to store said second plurality of data.

2. An apparatus for receiving data on at least one isochronous USB endpoint pipe from a USB host, said apparatus comprising:
   a first USB endpoint including a receiver which sequentially receives from the USB host a first plurality of data having a first sequence number and a second plurality of data having a second sequence number;
   a controller coupled to the receiver and configured to generate an interrupt if a difference between said first sequence number and said second sequence number is greater than three;
   a first data storage element configured to store said first plurality of data;

a second data storage element configured to store said second plurality of data; and at least one additional USB endpoint, wherein each said additional endpoint is coupled and configured to receive data from the USB host, is coupled to the first data storage element, the second storage data element, and the controller, and is configured to share said first data storage element, said second data storage element, said receiver, and said controller with the first USB endpoint.

3. An apparatus for receiving data on at least one isochronous USB endpoint pipe from a USB host, said apparatus comprising:

a first USB endpoint including a receiver which sequentially receives from the USB host a first plurality of data having a first sequence number and a second plurality of data having a second sequence number;

a controller coupled to the receiver and configured to generate an interrupt if a difference between said first sequence number and said second sequence number is greater than three;

a first data storage element configured to store said first plurality of data; and a second data storage element configured to store said second plurality of data, wherein the first plurality of data is a framing packet having a frame number, and the receiver further comprises:

a pointer data storage element;

a pointer controller which stores in said pointer data storage element an address pointer corresponding to said first data storage element;

a toggle data storage element which stores a toggle value; and a frame number data storage element, wherein said controller is configured to store said frame number in said frame number data storage element, wherein if said toggle value is set, if at least a portion of said frame number corresponds to at least a portion of said address pointer, said controller writes said first plurality of data to said first data storage element, and wherein if said toggle value is not set, said controller writes said first plurality of data to said first data storage element, and if at least a portion of said frame number fails to correspond to at least a portion of said address pointer, said controller generates an error flag.

4. A method of receiving data on an isochronous USB endpoint pipe at a USB endpoint from a USB host, comprising the steps of:

receiving from the USB host a first plurality of data having a first sequence number;

after receiving the first plurality of data, receiving from the USB host a second plurality of data having a second sequence number; and generating an interrupt if a difference between said first sequence number and said second sequence number is greater than three.

5. A method of receiving data on an isochronous USB endpoint pipe at a USB endpoint from a USB host, comprising the steps of:

receiving from the USB host a first plurality of data having a first sequence number;

after receiving the first plurality of data, receiving from the USB host a second plurality of data having a second sequence number; and generating an interrupt if a difference between said first sequence number and said second sequence number is greater than three, wherein the first plurality of data is a framing packet having a frame number, and said step of receiving the first plurality of data further comprises the steps of:

generating an address pointer corresponding to a buffer data storage element;

examining a toggle value;

if said toggle value is set, if at least a portion of said framing packet corresponds to at least a portion of said address pointer, writing said first plurality of data to said buffer data storage element; and if said toggle value is not set, writing said first plurality of data to said buffer data storage element, and if at least a portion of said framing packet fails to correspond to at least a portion of said address pointer, generating an error flag.

6. An apparatus for receiving data on at least one isochronous USB endpoint pipe from a USB host, said apparatus comprising:

a first USB endpoint including a receiver configured to receive from the USB host a first plurality of data having a first sequence number and then to receive from the USB host a second plurality of data having a second sequence number; and a controller coupled to the receiver and configured to generate an interrupt if a difference between said first sequence number and said second sequence number is greater than three.

* * * * *